April 9, 1957 R. J. DOERING ET AL 2,788,385
SPLICE CLOSURE FOR SHEATHED CABLE
Filed Dec. 11, 1952 3 Sheets-Sheet 1
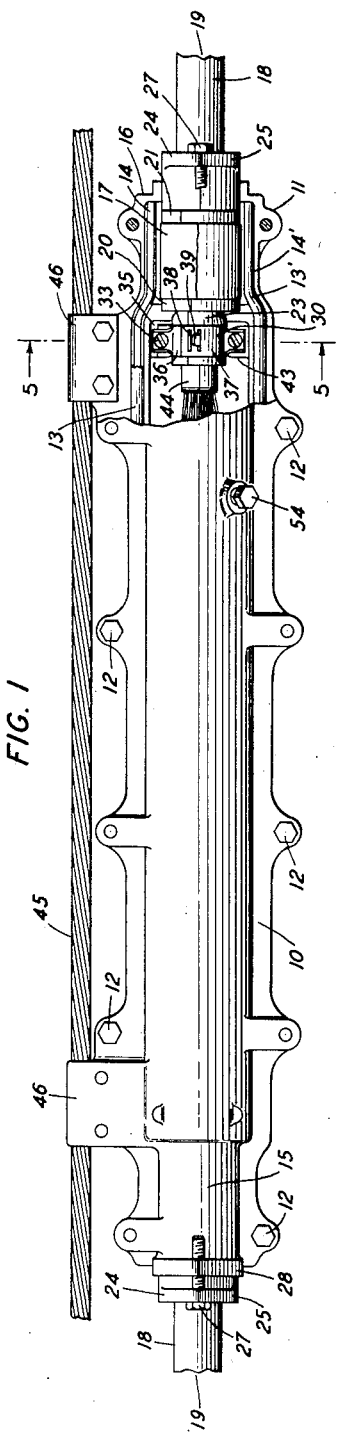
INVENTORS: R. J. DOERING
W. C. KLEINFELDER
H. E. PAWEL
BY
ATTORNEY April 9, 1957 R. J. DOERING ET AL 2,788,385
SPLICE CLOSURE FOR SHEATHED CABLE
Filed Dec. 11, 1952 3 Sheets-Sheet 2

INVENTORS: R. J. DOERING
W. C. KLEINFELDER
H. E. PAWEL

BY
ATTORNEY

April 9, 1957  R. J. DOERING ET AL  2,788,385
SPLICE CLOSURE FOR SHEATHED CABLE
Filed Dec. 11, 1952  3 Sheets-Sheet 3

INVENTORS: R. J. DOERING
W. C. KLEINFELDER
H. E. PAWEL
BY
ATTORNEY

United States Patent Office 2,788,385
Patented Apr. 9, 1957

2,788,385

SPLICE CLOSURE FOR SHEATHED CABLE

Robert J. Doering, Springfield, Walter C. Kleinfelder, Summit, and Hans E. Pawel, Irvington, N. J., assignors to Bell Telephone Laboratories, Incorporated, New York, N. Y., a corporation of New York Application December 11, 1952, Serial No. 325,363

3 Claims. (Cl. 174—92)

This invention relates to splices or joints for electrical cable and more particularly to a mechanical splice case or closure for joints in multiconductor sheathed cable.

One object of the invention is the provision of a mechanical splice closure or case for enclosing joints in thermoplastic or metallic sheathed cable which protects the enclosed splice or joint from the elements and is substantially gas tight.

Another object of the invention is the provision of a splice case or closure which comprises relatively few parts, is as strong mechanically as the cable itself and provides the electrical continuity of the conductive elements of the cable sheath without substantially increasing the electrical resistance thereof.

A further object of the invention is the provision of a splice case or closure which may be readily applied over an existing joint in an unbroken or continuous length of cable or applied to a new joint where the ends of the cable are free.

A still further object of the invention is the provision of a mechanical splice case wherein cables having various outside diameters may be readily accommodated.

A still further object of the invention is the provision in a mechanical splice case or a closure wherein mating halves make up the housing, of a cementitious sealing material which seals the joint between the halves at their meeting edges and combines with a like cementitious sealing material at the ends of the case to provide a homogeneous mass thereby providing a unitary unbroken seal between the mating halves of the case and the sheath of the cable.

A still further object of the invention is the provision of a mechanical splice case or closure which due to its novel construction is readily adaptable to the incorporation of a cable terminal as part of the splice closure.

The splice case or closure of this invention, which is of the mechanical type as differentiated from the well known lead sleeve and wiped joint type, is particularly adapted to, but not limited to multiconductor cables having a plurality of insulated conductors with a jacket of insulating material therearound, a thin metallic sheath surrounding the insulating jacket and an outer sheath of thermoplastic enclosing the whole.

The invention embraces a method and means for making joints or splices in multiconductor cable of the type heretofore referred to. The splice closure or case of this invention, which comprises in the main two mating halves of like configuration, having a cementitious sealing material between their meeting edges, may be constructed of steel, aluminum alloy, plastic or any other suitable material having the necessary strength and corrosion resistant requirements. However, castings of aluminum alloy or similar alloys are advantageous as they provide a structure which is light in weight, structurally strong, and highly resistant to corrosion.

The ends of the splice closure are reduced in diameter, are adapted to embrace the sheath of the cable and are provided with stuffing boxes or glands at the ends, in which are positioned bushings composed of cementitious material having the same composition as the sealing compound between the mating halves of the closure. Thus when the two halves of the closure are secured together and the bushings at the ends of the closure are compressed by compression type fittings, the sealing compounds will commingle to form a homogeneous tight seal between the mating halves of the closure and around the sheath of the cable thereby providing a structure which is impervious to the entrance of moisture.

In order to provide a strong mechanical joint and to insure the electrical continuity of the metallic components of the cable, the sheath, which may be of metal alone or metal and plastic, is firmly clamped to one of the mating halves at each end of the closure thereby providing a metallic circuit through the metal sheath of the cable and the metallic splice closure, and at the same time firmly anchoring the cable ends to the splice closure.

In order to accommodate cables having different outside diameters, washers having "knock-out" portions are provided on each side of the sealing bushings. These washers firmly embrace the ends of the sealing bushings, center the cable and prevent the extrusion of the sealing material, in a longitudinal direction, when the compression fittings on the ends of the splice closure are tightened.

In those instances where it is desired to gain access to the conductors in the cable in order to provide connections for subscribers' lines, one half of the closure is dispensed with and a similar casting, having the same sealing features, but having a cable terminal incorporated therein is substituted.

The invention will be more clearly understood from the following detailed description when read in connection with the accompanying drawings of which:

Fig. 1 is an elevational view of the splice closure illustrative of this invention secured to a supporting strand and embracing the ends of the cable, one end of the closure being broken away to disclose the sealing and securing means;

Fig. 2 is an enlarged exploded view in perspective, disclosing the component parts utilized in making the seal and anchoring the cable to the casting of the closure;

Figure 3:
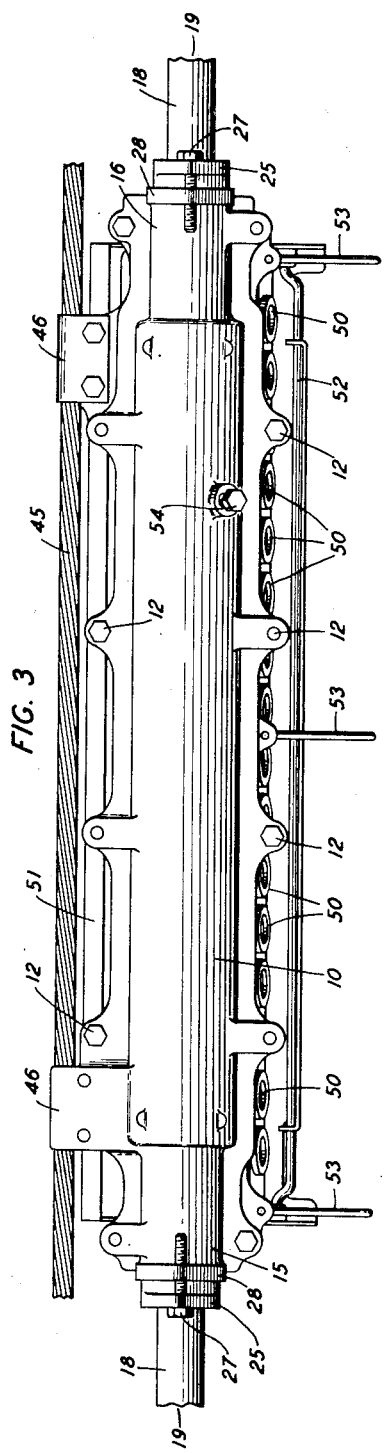
Fig. 3 is a rear elevational view of a splice closure which incorporates a cable terminal as part of the splice closure structure.

In the preferred embodiment of our invention, as shown in Fig. 1 and the associated Figs. 2, 5, 6, and 7, we have provided a substantially cylindrically shaped elongated housing which is intended to enclose the cable splice, firmly embrace the sheath of the cable to prevent the escape of gas and the entrance of moisture and to firmly anchor the cable ends in the closure housing to provide mechanical strength which closely approximates the strength of the cable itself.

The proposed structure comprises two substantially similar, elongated, trough-shaped mating halves or castings 10 and 11, which may be of steel, aluminum alloy, plastic or any other suitable material which is strong and highly resistant to corrosion. However, it has been found that if the members or casting halves 10 and 11 comprise aluminum alloy castings the necessary rigid requirements are adequately met.

As shown in Fig. 1, a gas and moisture-tight seal is provided at each end of the closure together with an anchoring means for the cable. The anchoring means disclosed not only secures the cable ends in the casing but also provides the necessary electrical continuity of the metallic sheath of the cable.

The component parts which are utilized to seal the ends of the closure and to anchor the cable in place are shown in detail in the exploded view in Fig. 2.

The structure shown in Fig. 1 comprises essentially two mating halves or castings 10 and 11 secured together by means of the studs 12 which are positioned along the marginal edges of the casting and are in threaded engagement with the opposed casting. In order to provide a tight seal between the meeting edges of the castings 10 and 11 a cementitious material or sealing compound 13—13, in the form of a string, is positioned in the substantially V-shaped grooves 14—14 located in the meeting edges of the castings 10 and 11 as shown in detail in Fig. 5. The cross sectional areas of the grooves are substantially less than the cross sectional area of the strings 13—13, to assure compression of the material against the walls of the grooves.

The seals at the ends of the closure are located in the reduced diameter portions 15 and 16 of the castings 10 and 11 as shown in Fig. 1, and more in detail in Fig. 2, a bushing or sleeve 17 formed from several turns of tape wrapped one over the other and in intimate contact with the sheath 18 of the cable 19. The tape formed bushing 17 is made from a material having the same composition as the string sealing compound 13—13 and when applied as shown, forms a sleeve or bushing having a substantially solid wall, since the convolutions readily adhere together to form a homogeneous structure.

The material for the strings 13—13 and the bushings 17—17 are of the cold flow type. A particular advantageous composition comprises Butyl Rubber, 100 parts by weight, Vistac No. I (polyisobutylene, having a molecular weight of 1100), 100 parts by weight, Philblack A (Carbon black) 150 parts by weight.

Figure 6:
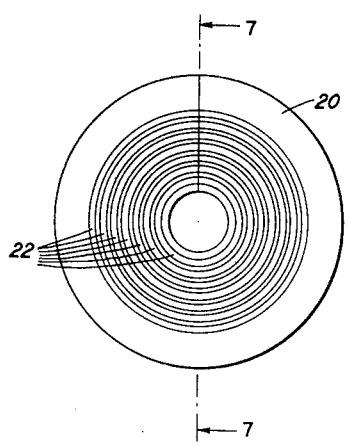
Fig. 6 is an enlarged elevational view of the "knock-out" washer which is positioned around the cable adjacent the end bushings.
Figure 7:
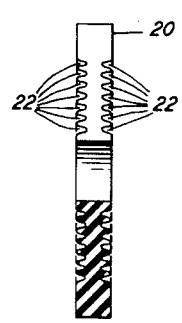
Fig. 7 is a cross sectional view taken on line 7—7 of Fig. 6.

As shown in Fig. 1 the bushing 17 is positioned on the cable sheath 18 adjacent the cable end and is located between the "knock-out" washers 20 and 21 which are provided, as shown in Figs. 6 and 7, with concentric grooves 22—22 on each face thereof to facilitate the removal of the "knock-outs" to accommodate various sizes of cables. The outer face of the inner washer 20 is in abutting relation with the expanded portion 23 of the cable sheath 18, which is formed by the anchoring means which will be hereinafter described in detail. Thus the bushing 17 is held against longitudinal movement, when the split gland or collar, which comprises the members 24 and 25, is forced against the washer 21, to compress the bushing 17, by means of the studs 26 and 27 which are adapted to threadedly engage the extending ear portions 28—28 on the reduced end portions 15 and 16 of the castings 10 and 11. Thus the bushing 17 will be compressed and caused to flow into intimate contact with the sheath 18 of the cable 19 and the inner walls of the reduced end portions 15 and 16 of the castings 10 and 11, thereby providing a gas-tight and moisture proof seal between the cable sheath and the splice closure.

In order to firmly anchor the cable ends in the splice closure and to maintain thte electrical continuity of the metallic sheath, clamping means which comprise an inner clamp and reinforcement 29 and an outer clamp 30 are positioned at each end of the closure.

Figure 5:
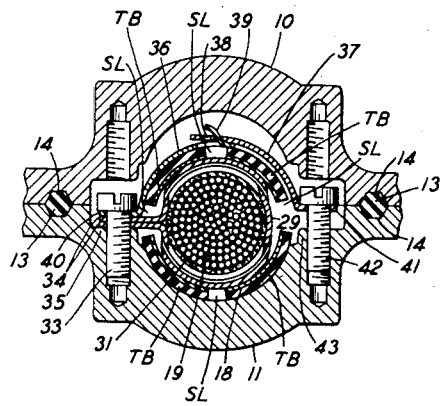
Fig. 5 is an enlarged cross sectional view taken on line 5—5 of Fig. 1.

As shown in detail in Fig. 5, the inner clamp 29 is positioned around the paper serving 31 of the cable 19, directly underlies and is in intimate contact with the inner surface of the metallic sheath 32. The clamp 29 is secured to the casting 11 by means of a stud 33 which passes through apertures in the extending ear portions 34—34 of the clamp 29 and into threaded engagement with a boss 35 on the interior of the casting 11. Positioned over the expanded or bulged portion 23 of the cable 19 and bearing against the sheath 18, is an outer clamp 30. This clamp as shown comprises two arcuate members 36 and 37 joined together at their inner ends by means of a slot 38 and a tab 39, thus providing a substantially semicircular strap or clamp. Located on the free ends of the clamp 30 are ear portions 40 and 41 through which pass the studs 33 and 42. The studs 33 and 42 are adapted to threadedly engage the boss 35 heretofore referred to with respect to the stud 33 and the inner clamp 29, and the boss 43. When the studs 33 and 42 are secured as shown in Figs. 1 and 5, the inner clamp 29 will surround the conductors of the cable 19, provide an irregular surface of adequate strength to which the sheaths 18 and 32 are secured by the outer clamp 30, to prevent compressive forces from injuring the conductors of the cable 19, and at the same time provide an expanding member for the inner metal sheath 32 and the outer plastic sheath 18 thereby providing an intimate electrical contact between the metallic sheath 32 and the casting 11 and at the same time firmly gripping the expanded portion 23 of the outer sheath 18. A wrapping of tape 44 is positioned around the conductors of the cable 19 adjacent the clamps 29 and 30 to prevent the paper serving 31 on the conductors from being displaced or injured during the installation of the splice closure.

As shown in Fig. 1 the splice closure of this invention is adapted to be supported from a suitable messenger strand 45 by means of clamps 46—46, portions of which are integral with the castings.

In assembling the splice closure of this invention, to mechanically secure the ends of the cable together and to seal the closure against the escape of gas and the entrance of moisture, the following installation procedure is followed:

Using the half 11 of the unassembled closure, as a guide the ends of the cable to be joined are crossed one over the other a sufficient amount to provide adequate conductor length for splicing. With the closure positioned on the cable, as above described, the outer sheath 18 is marked on each side of the supporting bosses 43—43 which are located adjacent the ends 15 and 16 of the casting 11, to provide an outer sheath opening designation and an inner mark for determining the length of longitudinal slits which will hereinafter be described. The closure 11 is then removed and the sheath 18 is ringed by means of a suitable tool at the sheath opening mark completely around and about half way through the sheath 18. After this operation the sheath 18 is cut longitudinally from the end of the cable to the scored ring to facilitate the removal of the sheath, which upon being removed exposes the metallic sheath 32 which underlies the sheath 18 and which is subsequently removed.

After the removal of the metallic sheath 32 and the paper core wrapper 31 is exposed, the outer sheath 18 and the metallic sheath 32 are longitudinally slit as shown at SL in Figs. 2 and 5. These longitudinal slits are spaced approximately 90 degrees apart and extend from the free end of the sheath 18 to the inner mark, previously made on the cable sheath, to provide four tab portions TB. The next step is to slip the circular clamp 29, as shown in Figs. 2 and 5, over the paper core wrapper 31 and position it under the tabbed portion of the sheath and in contact with the inner surface of the metallic sheath 32, with the ear portions 34—34 extending through the top slit. In order to protect the paper core wrapper 31 adjacent the clamps 29 and 30, a collar 24 comprising two layers of suitable tape are wrapped around the paper wrapper; the paper serving is then removed to expose the individual conductors which are then spliced in the usual and well known manner.

With the conductors in the cable spliced and prepared in the usual manner, and with a wrapping or serving of suitable material therearound, the splice is now ready to be positioned in the closure and secured in place. The first step in this procedure is to clean the cable sheath 18 adjacent the clamps 29—29 and position, in spaced apart relation, the washers 20 and 21 using the casting 11 as a guide. These washers, as shown in Figs. 6 and 7 are of the "knock-out" variety, that is they may be altered to fit cables of various diameters by cutting or pushing out portions thereof since they have been prescored with concentric indentations or grooves 22.

With the washers 20 and 21 in place on the cable sheath, a sealing tape of cementitious material is wrapped around the sheath between the washers to provide a bushing or sleeve 17, as shown in detail in Fig. 2. The bushings 17—17 should have an outside diameter substantially the same or slightly larger than the diameter of the washers 20 and 21.

When each end of the cable splice has been prepared as heretofore described the splice is positioned in the casting 11 with the bushings 17—17 and the washers 20 and 21 positioned in the reduced end portions of the casting as shown in Fig. 1. The splice is now ready to be mechanically secured to the casting 11. This is accomplished by positioning the outer sheath clamps 30—30 which comprise the members 37 and 38 over the sheath tabs TB in alignment with the inner clamps 29—29, so that the apertures therein will register with the apertures in the clamps 29—29 and the threaded apertures in the bosses 35—35 of the casting 11. Studs 33—33 pass through the apertures of the clamps 29—29 and 30—30 and into threaded engagement with the bosses 35—35 to secure the clamps 29—29, and the slotted portion 38—38 of the clamps 30—30 in place thereby establishing electrical contact between the metallic sheath 32 and the casting 11. After the completion of the above operation, the studs 42—42 are passed through the apertures in the lower halves 37—37 of the outer clamp 30—30 and into threaded engagement with the bosses 33—33 thereby firmly anchoring the cable ends in place and establishing electrical continuity of the metallic cable sheath.

With the cable secured in the ends of the closure as heretofore described, the next step is to position in the grooves 14—14 of the casting 11, strings 13—13 of a cementitious sealing compound. These strings are of the same composition as the tape which comprise the bushings 17—17. After the sealing strings 13—13 have been positioned, the mating half or casting 10 is secured to its mate 11, by means of the bolts 12.

The final step in the installation of the splice closure of this invention, is to position the compression collars, which comprise the members 24 and 25, in the reduced ends of the closure and tighten the studs 26—26 and 27—27 to force the washers 21—21 against the bushings 17—17 to cause the bushings to expand, unite with the string seal 13—13 and form an integral homogeneous seal between the castings 10 and 11 and the cable sheath 18, thereby preventing the escape of gas and the entrance of moisture.

Figure 4:
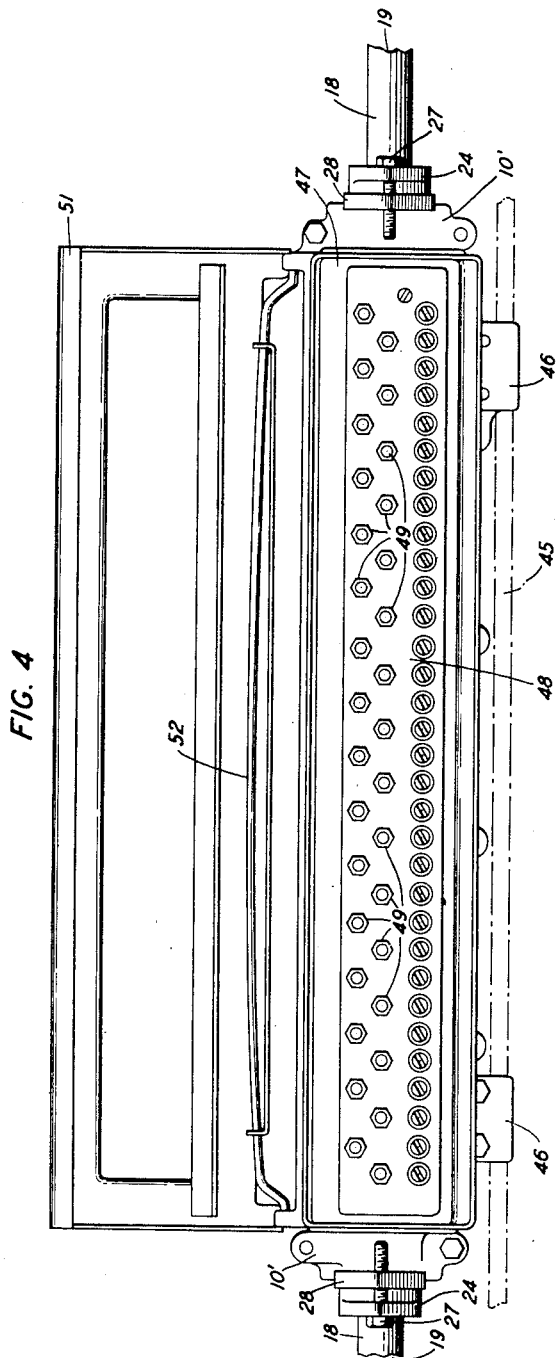
Fig. 4 is a front elevational view of the splice closure shown in Fig. 3 with the cover of the terminal open to permit access to the binding post panel.

When it is desired to combine a cable terminal with the splice case of this invention a structure as shown in Figs. 3 and 4 is provided. In this construction, the cable 19 is secured to the cable terminal casting 11', in the same manner as heretofore described, with respect to the casting 10. Casting 11 is dispensed with and the casting 11', incorporating the cable terminal housing 47 and having a binding post panel 48 on the interior thereof, is provided. The cable terminal which comprises the housing 47 and the panel 48 is similar in construction to the cable terminal shown in Patent No. 2,285,034, granted June 2, 1942 to L. W. Kelsay.

As shown in Figs. 3 and 4, the castings 10 and 11' are provided with the compression fittings as heretofore described with respect to the splice closure shown in Fig. 1 and are supported from the strand 45 in the same manner. The terminal half of the closure, which is substituted for the casting 11, has the same general configuration as the casting 10 but in addition has cast integral therewith a housing 47 provided on its interior with a binding post panel 48, the front of which is provided with suitable binding posts 49 to which subscribers' lines (not shown) are adapted to be connected and brought out through the insulated bushings 50 at the bottom of the housing 47. Leads from the cable splice are connected to the rear portions of the binding post 49, which extend into the interior of the splice closure.

A suitable hinged cover 51 having a spring closing member 52 is provided for preventing the entrance of moisture and unauthorized access. As shown, conductor supporting rings 53 are provided on the bottom of the terminal housing and support the subscribers drop wires. In order to provide for the introduction of a gas into the closure a fitting 54 is provided in the castings 10 and 11.

While we have shown and described the preferred embodiments of our invention, it is to be understood that various changes and modifications may be made therein without departing from the spirit and scope of the invention.

What is claimed is:

1. A splice closure comprising two members defining a chamber for enclosing a joint in sheathed cable, means along the marginal edges of said members for maintaining the meeting edges in intimate contact, a spliced cable, having a central core, positioned in the chamber and having portions thereof extending from each end, clamping means in said chamber adjacent the inner ends of the cable sheath for securing said cable against longitudinal movement, said clamping means comprising a clamp underlying the sheath of the cable and embracing the core thereof and a second clamp overlying and forcing the cable sheath into intimate contact with the first clamp, sealing means positioned between the meeting edges of said members and sealing means around the cable at each end of the closure to provide a tight joint therebetween, said sealing means being of like composition and commingling to provide a homogeneous seal between the cable and the closure, and means at each end of the closure for forcing the sealing material located around the cable into intimate contact with the outer surface of the cable sheath and the inner surface of said closure.

2. A splice closure comprising two elongated body members defining a chamber for enclosing a joint in sheathed cable, means along the marginal edges of said members for maintaining the meeting edges in intimate contact, a spliced cable comprising a central core member, an inner metallic sheath overlying said core and an outer sheath of insulating material, positioned in the chamber and having portions thereof extending from each end, clamping means in said chamber adjacent the inner ends of the cable sheath for securing said cable against longitudinal movement, said clamping means including an encircling sleeve member interposed between the inner metallic sheath and the core of the cable and a clamp of arcuate configuration overlying the outer sheath and forcing the inner metallic sheath and the outer sheath into intimate engagement with the sleeve member, sealing means positioned between the meeting edges of said members and sealing means around the cable at each end of the closure to provide a tight joint therebetween, said sealing means being of like composition and commingling to provide a homogeneous seal between the cable and the closure, and means at each end of the closure for forcing the sealing material located around the cable into intimate contact with the outer surface of the cable sheath and the inner surface of said closure.

3. A splice closure comprising two elongated body members defining a chamber for enclosing a joint in sheathed cable, means along the marginal edges of said members for maintaining the meeting edges in intimate contact, a spliced cable comprising a central core member, an inner metallic sheath overlying said core and an outer sheath of insulating material, positioned in the chamber and having portions thereof extending from each end, clamping means in said chamber adjacent the inner ends of the cable sheath, said clamping means including an encircling embossed split sleeve member, having apertured ear portions extending therefrom, interposed between the inner metallic sheath and the core of the cable, and an arcuate two-part clamp overlying the outer sheath and securing means passing through said clamp and the apertured ear portions of said sleeve and into one of said body members for forcing the inner metallic sheath and the outer sheath into intimate engagement with the sleeve member, sealing means positioned between the meeting edges of said members and sealing means around the cable at each end of the closure to provide a tight joint therebetween, said sealing means being of like composition and commingling to provide a homogeneous seal between the cable and the closure, and means at each end of the closure for forcing the sealing material located around the cable into intimate contact with the outer surface of the cable sheath and the inner surface of said closure.

References Cited in the file of this patent

UNITED STATES PATENTS

| | | |
|---|---|---|
| 1,718,817 | Greene | June 25, 1929 |
| 2,066,320 | Bennett | Jan. 5, 1937 |
| 2,509,523 | Pouzet | May 30, 1950 |
| 2,621,228 | Tompers | Dec. 9, 1952 |

FOREIGN PATENTS

| | | |
|---|---|---|
| 572,466 | Germany | Mar. 16, 1933 |